(12) United States Patent
Baek et al.

(10) Patent No.: US 10,379,362 B2
(45) Date of Patent: Aug. 13, 2019

(54) HEAD MOUNTED DISPLAY AND CONTROL METHOD THEREOF

(71) Applicant: LG ELECTRONICS INC., Seoul (KR)

(72) Inventors: Sungmin Baek, Seoul (KR); Soungmin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/748,615

(22) PCT Filed: Aug. 5, 2015

(86) PCT No.: PCT/KR2015/008189
§ 371 (c)(1),
(2) Date: Jan. 29, 2018

(87) PCT Pub. No.: WO2017/022872
PCT Pub. Date: Feb. 9, 2017

(65) Prior Publication Data
US 2019/0004316 A1 Jan. 3, 2019

(30) Foreign Application Priority Data
Aug. 4, 2015 (KR) .......... 10-2015-0110243

(51) Int. Cl.
*G02B 27/01* (2006.01)
*G06T 19/00* (2011.01)
(Continued)

(52) U.S. Cl.
CPC ......... *G02B 27/0172* (2013.01); *G02B 27/01* (2013.01); *G06F 3/002* (2013.01);
(Continued)

(58) Field of Classification Search
CPC .............. G02B 27/0172; G02B 27/01; G02B 2027/0178; G02B 2027/0161; G06F 3/011; G06F 3/002; G06T 19/006; G06T 7/70

See application file for complete search history.

(56) References Cited

U.S. PATENT DOCUMENTS

| 7,881,560 B2 | 2/2011 | John | |
|---|---|---|---|
| 2012/0127284 A1* | 5/2012 | Bar-Zeev | G02B 27/017 348/53 |

(Continued)

FOREIGN PATENT DOCUMENTS

| JP | 2010056661 | 3/2010 |
|---|---|---|
| JP | 2013164737 | 8/2013 |
| KR | 10-1999-0073928 | 10/1999 |

OTHER PUBLICATIONS

PCT International Application No. PCT/KR2015/008189, International Search Report dated May 4, 2016, 2 pages.

(Continued)

*Primary Examiner* — Ibrahim A Khan
(74) *Attorney, Agent, or Firm* — Lee, Hong, Degerman, Kang & Waimey

(57) ABSTRACT

The present invention relates to a head mounted display (HMD) capable of receiving an image through a camera. An HMD according to an embodiment of the present invention comprises: a main body configured to be worn on a user's head; a camera equipped in the main body; a sensing unit configured to measure the distance between the main body and a subject corresponding to the image received through the camera; and a control unit which determines a plurality of feature points satisfying preset conditions in the image, measured, by means of the sensing unit, the distance between the main body and the subject corresponding to at least one of the plurality of feature points, and determines (Continued)

(a)

(b)

the movement of the main body on the basis of at least one of the plurality of feature points and the measured distance.

13 Claims, 11 Drawing Sheets

(51) Int. Cl.
    *G06T 7/70*     (2017.01)
    *G06F 3/00*     (2006.01)
    *G06F 3/01*     (2006.01)

(52) U.S. Cl.
    CPC ............... *G06F 3/011* (2013.01); *G06T 7/70* (2017.01); *G06T 19/006* (2013.01); *G02B 2027/0161* (2013.01); *G02B 2027/0178* (2013.01)

(56) References Cited

U.S. PATENT DOCUMENTS

| | | | |
|---|---|---|---|
| 2012/0249741 A1* | 10/2012 | Maciocci | G06F 3/011 348/46 |
| 2012/0294478 A1* | 11/2012 | Publicover | G06K 9/00604 382/103 |
| 2013/0278497 A1 | 10/2013 | Takagi et al. | |
| 2016/0189426 A1* | 6/2016 | Thomas | G06T 19/006 345/633 |
| 2016/0261300 A1* | 9/2016 | Fei | H04W 4/70 |
| 2016/0349510 A1* | 12/2016 | Miller | G02B 27/0172 |
| 2019/0012799 A1* | 1/2019 | Tsurumi | G06T 1/00 |

OTHER PUBLICATIONS

Korean Intellectual Property Office Application No. 10-2015-0110243, Office Action dated Oct. 28, 2016, 5 pages.
Korean Intellectual Property Office Application No. 10-2015-0110243, Notice of Allowance dated Feb. 9, 2017, 2 pages.

\* cited by examiner

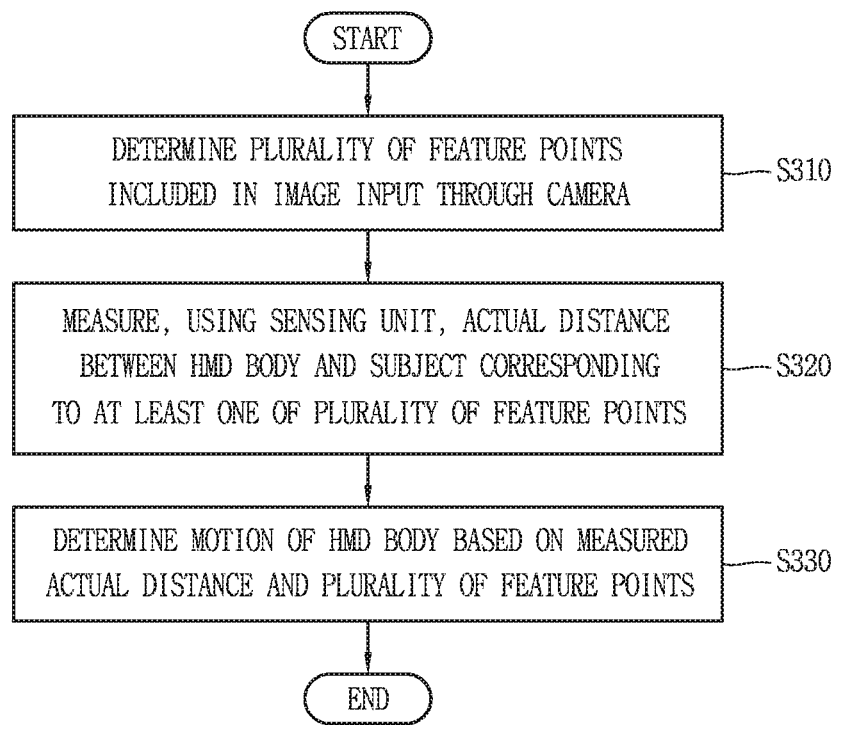

FIG. 4
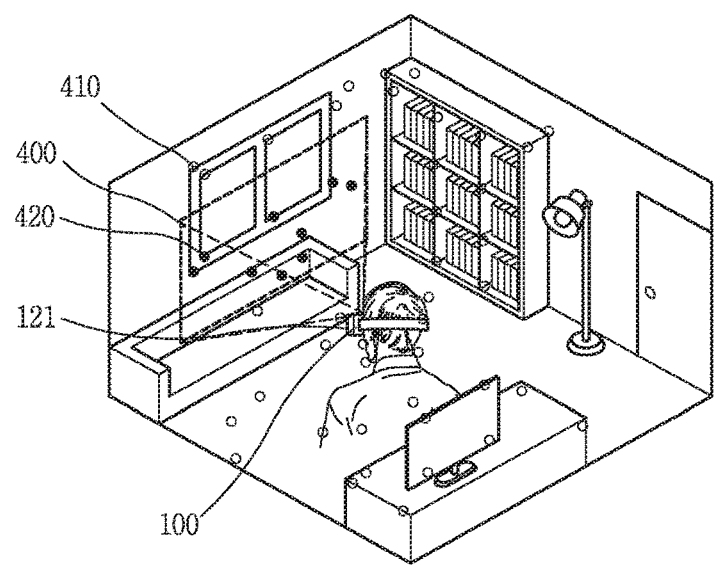
(a)
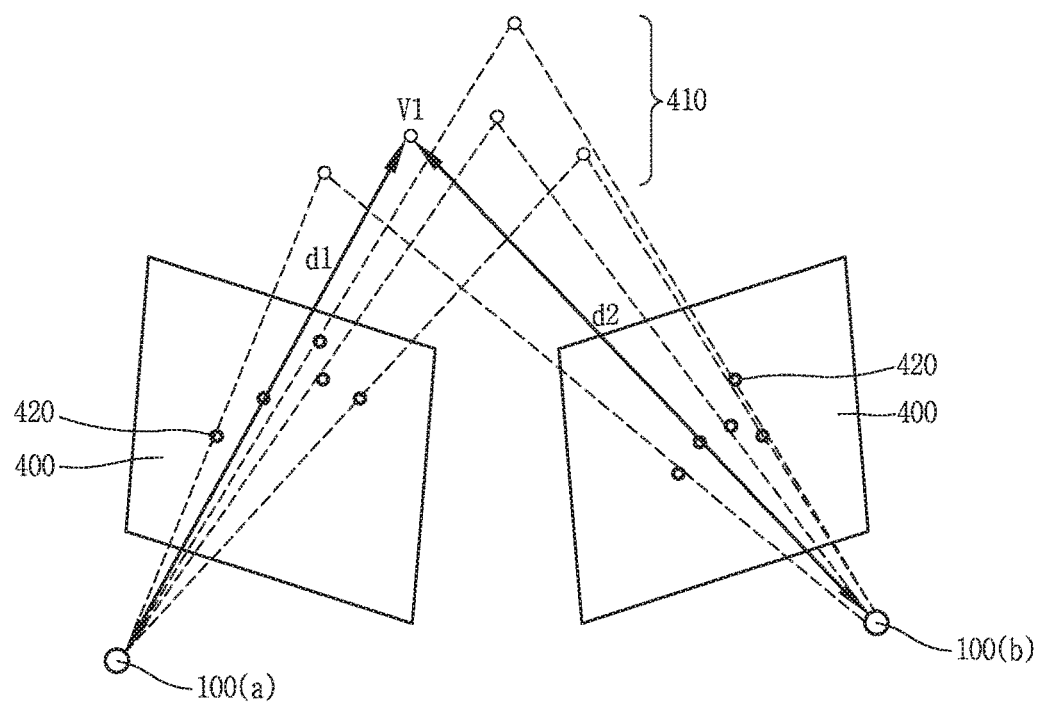
(b)

FIG. 5A
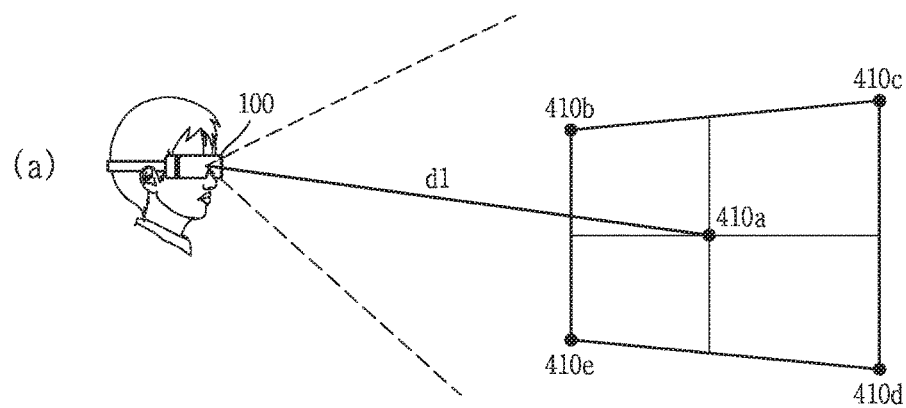
(a)
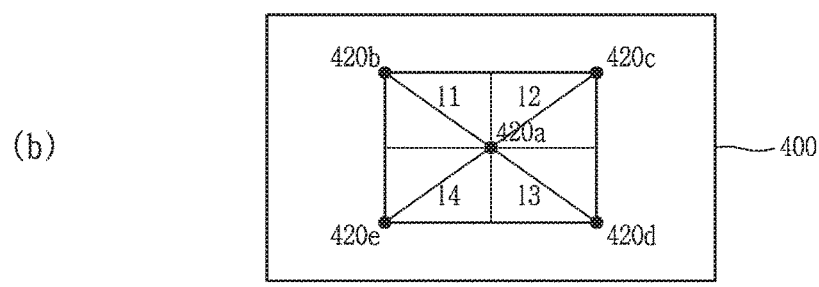
(b)
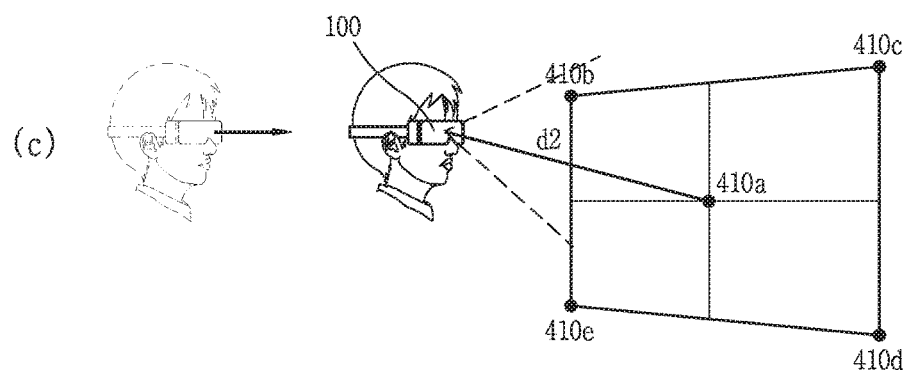
(c)
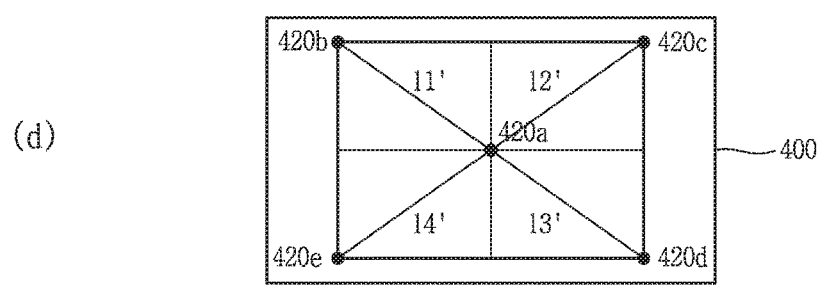
(d)

FIG. 5B
(a) 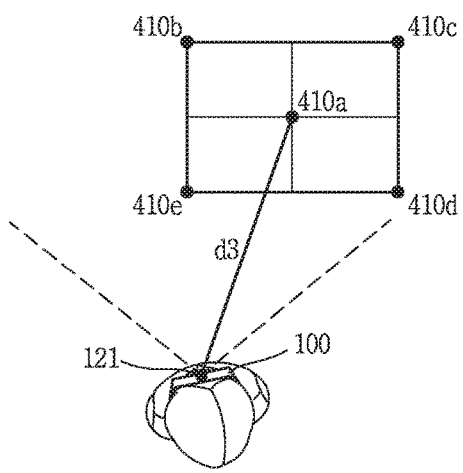
(b) 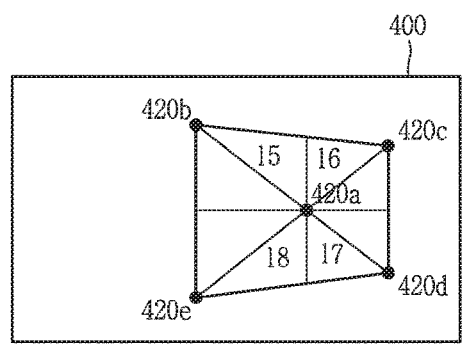
(d) 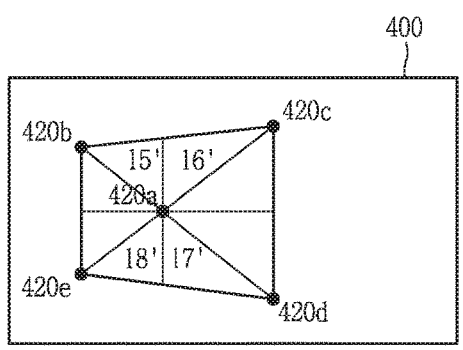
(c) 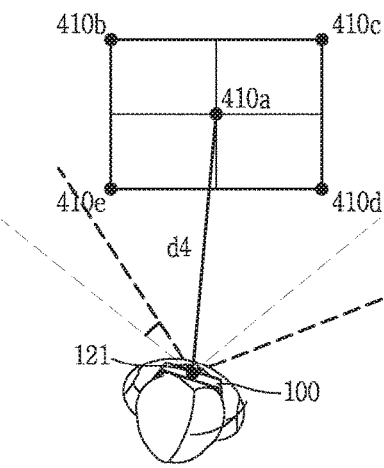

FIG. 6
(a)
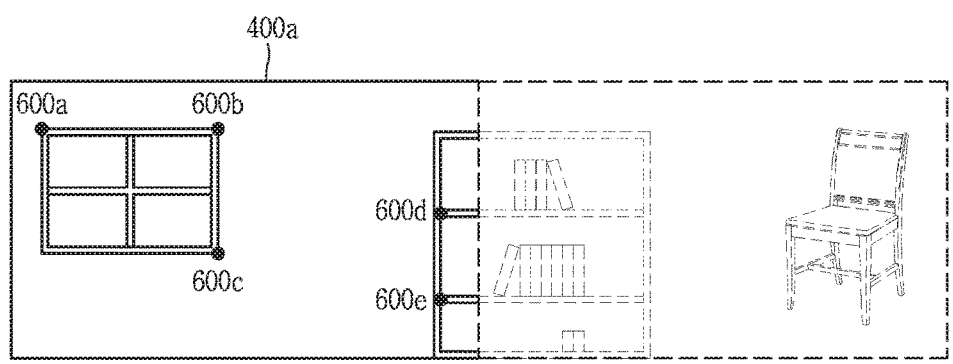
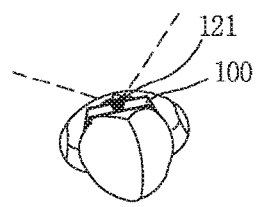
(b)
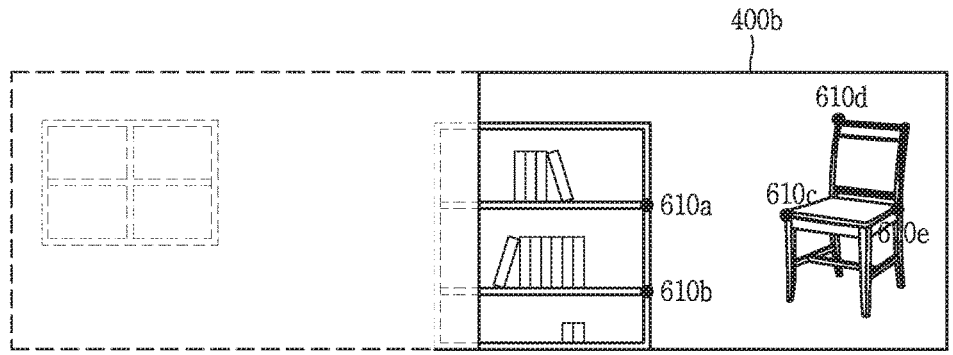
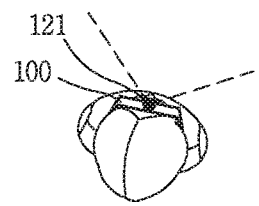

HEAD MOUNTED DISPLAY AND CONTROL METHOD THEREOF

CROSS-REFERENCE TO RELATED APPLICATIONS

This application is the National Stage filing under 35 U.S.C. 371 of International Application No. PCT/KR2015/008189, filed on Aug. 5, 2015, which claims the benefit of earlier filing date and right of priority to Korean Application No. 10-2015-0110243, filed on Aug. 4, 2015, the contents of which are all hereby incorporated by reference herein in their entirety.

TECHNICAL FIELD

The present invention relates to a head mounted display (hereinafter, referred to as 'HMD') capable of receiving an image through a camera.

BACKGROUND ART

Terminals may be divided into mobile/portable terminals and stationary terminals according to mobility. Also, glass type terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

A wearable glass type terminal which is wearable on a part of a human body is recently developed. A glass type terminal worn on a user's head may correspond to a head mounted display (HMD).

A head-mounted display (HMD) refers to various image display devices such as glasses that are worn on a user's head to allow the user to view images (contents). Various wearable computers (Wearable Computers) have been developed depending on the trend of weight reduction and size reduction of digital devices, and the HMD is also widely used.

A display unit provided in a glass type terminal such as an HMD may provide various conveniences to the user by combining with an augmented reality technology, an N-screen technology and the like beyond a simple image output function.

Recently, with the increase in the use of the HMD, methods of performing various functions according to a posture of the HMD are being actively developed. Here, the posture of the HMD is a concept including a laid state of the HMD (a worn state on the user's head), a tilted degree of the HMD, a direction that the HMD faces, a position of the HMD, a rotation of the HMD, a motion of the HMD, and the like.

To this end, it is necessary to determine (estimate, track, detect, extract, decide, identify, recognize, etc.) the posture of the HMD.

As the related art method for determining the posture of the HMD, there is a method of providing light emitting elements outside the HMD body and determining the posture of the HMD using an external camera which is a device separate from the HMD. For example, in the related art method of determining the posture of the HMD, each light emitting element is identified by synchronizing an on/off time of the light emitting element provided outside the HMD body with an opening/closing time of a shutter of the external camera, and the posture of the HMD is determined by tracking the identified light emitting element.

However, according to the related art method, since the separate external device should be used, costs increase. Further, the motion of the HMD can be detected but a moved degree of the HMD, namely, an actually moved distance or rotated degree of the HMD cannot be accurately determined.

DISCLOSURE OF THE INVENTION

One aspect of the present invention is to provide a head mounted display (HMD) capable of determining a posture thereof by an optimized method, and a method of controlling the same.

Another aspect of the present invention is to provide an HMD capable of determining a posture thereof without a separate external device, and a method of controlling the same.

Another aspect of the present invention is to provide an HMD capable of more accurately determining a motion thereof, and a method of controlling the same.

Another aspect of the present invention is to provide an HMD capable of performing three-dimensional (3D) mapping by an optimized method, and a method of controlling the same.

To achieve these and other aspects of the present invention, in accordance with one embodiment of the present invention, there is provided a Head Mounted Display (HMD), including a main body formed to be wearable on a head of a user, a camera provided in the main body, a sensing unit configured to measure a distance between the main body and a subject corresponding to an image received through the camera, and a controller configured to determine a plurality of feature points satisfying a preset condition in the image, measure using the sensing unit a distance between the main body and a subject corresponding to at least one of the plurality of feature points, and determine a motion of the main body based on at least one of the plurality of feature points and the measured distance.

In an embodiment, the controller may determine the motion of the main body based on a rate of change of relative distances among the plurality of feature points and a rate of change of the measured distance.

In an embodiment, the controller may determine a rotated degree of the main body based on the rate of change of the relative distances among the plurality of feature points and the rate of change of the measured distance, and determine an actually moved distance of the main body based on the rate of change of the measured distance.

In an embodiment, the main body may be provided with at least two cameras disposed with being apart from each other, and the distance between the main body and the subject corresponding to the at least one feature point may be measurable using the at least two cameras.

In an embodiment, the controller may receive a new image through the camera due to the motion of the main body, and determine a new feature point satisfying the preset condition in the new image when the plurality of feature points are not included in the new image.

In an embodiment, the new feature point may be present in plurality, and the controller may measure a distance between the main body and a subject corresponding to at least one of the plurality of new feature points so as to use for determining the motion of the main body.

In an embodiment, the controller may determine a plurality of feature points satisfying the preset condition in a first image received through the camera, and generate first spatial information including information related to the plurality of feature points.

In an embodiment, the information related to the plurality of feature points may include a distance between the main body and a subject corresponding to at least one of the plurality of feature points, and relative distances among the plurality of feature points.

In an embodiment, the controller may determine a plurality of feature points satisfying the preset condition in a second image different from the first image when the second image is received through the camera due to the motion of the main body, and generate second spatial information including information related to the plurality of feature points included in the second image based on a number of duplicate feature points between the plurality of feature points included in the first image and the plurality of feature points included in the second image.

In an embodiment, the second spatial information may be generated when the number of duplicate feature points is a preset number or less.

In an embodiment, the controller may generate three-dimensional (3D) spatial information using the first spatial information and the second spatial information.

To achieve these and other aspects of the present invention, in accordance with one embodiment of the present invention, there is provided a method of controlling a Head Mounted Display (HMD), the method including determining a plurality of feature points satisfying a preset condition in an image received through a camera, measuring a distance between a main body of the HMD and a subject corresponding to at least one of the plurality of feature points, and determining a motion of the HMD based on at least one of the plurality of feature points and the measured distance.

In an embodiment, the determining may be configured to determine the motion of the main body based on a rate of change of relative distances among the plurality of feature points and a rate of change of the measured distance.

In an embodiment, the method may further include determining a plurality of feature points satisfying the preset condition in a new image received due to the motion of the HMD, and generating three-dimensional (3D) spatial information based on information related to the plurality of feature points included in the image and information related to the plurality of feature points included in the new image.

In an embodiment, the determining may be configured to generate first spatial information including the information related to the plurality of feature points included in the image, and generate second spatial information including the information related to the plurality of feature points included in the new image when the number of duplicate feature points among the plurality of feature points included in the image and the plurality of feature points included in the new image is a preset number or less. The 3D spatial information may be generated using the first spatial information and the second spatial information.

Advantageous Effects

According to the present invention, a motion of an HMD can be determined by using a feature point included in an image received through a camera, and a distance between a main body of the HMD and a subject corresponding to the feature point. Accordingly, the present invention can provide an optimized method for determining the motion of the HMD without a separate external device.

In addition, the present invention can determine a motion of an HMD based on an actual distance between a main body of the HMD and a subject corresponding to at least one of a plurality of feature points included in an image received through a camera, as well as relative distances among the plurality of feature points. Therefore, the present invention can remarkably improve determination accuracy as to the motion of the HMD.

In addition, the present invention can provide a control method capable of performing 3D mapping in an optimized manner using feature points included in an image received through a camera.

Further, the present invention can remarkably improve speed of determining a motion of an HMD by using 3D spatial information generated by 3D mapping.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 3 is a flowchart illustrating a representative control method in accordance with the present invention.

FIG. 4 is a conceptual view illustrating the control method illustrated in FIG. 3.

FIGS. 5A and 5B are conceptual views illustrating in more detail a method of determining a motion of the HMD in accordance with one embodiment of the present invention.

FIG. 6 is a conceptual view illustrating a control method in case where the HMD is rapidly rotated due to a motion of a user wearing the HMD.

BEST MODE OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The HMD described in this specification may include a wearable device (e.g., a smart glass) and the like.

However, it will be easily understood by those skilled in the art that the configuration according to the embodiments described herein, unless otherwise limited to a case of being applicable only to the HMD, may be applied even to mobile terminals, such as mobile phones, smart phones, laptop computers, digital broadcasting terminals, personal digital assistants (PDAs), personal digital assistants (PMPs), navigation systems, slate PCs, tablet PCs, ultrabooks, smartwatches, and the like.

Figure 1:
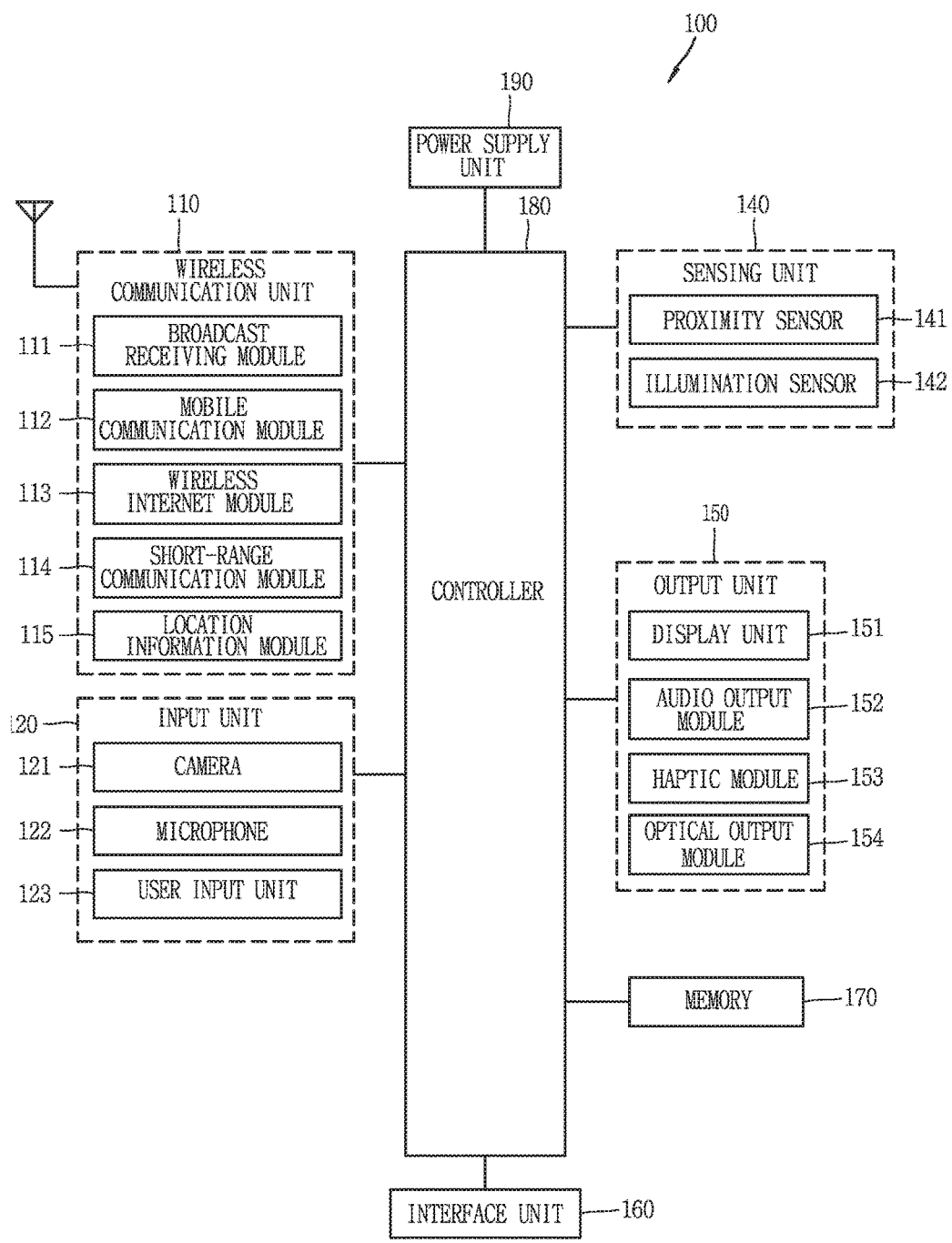
FIG. 1 is a block diagram of a head mounted display (HMD) in accordance with the present invention.

Referring to FIG. 1, FIG. 1 is a block diagram of a head mounted display (HMD) in accordance with the present invention.

The HMD 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

More specifically, among those components, the wireless communication unit 110 may include at least one module for allowing wireless communication between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server.

Further, the wireless communication unit 110 may typically include one or more modules which connect the HMD 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the HMD, the surrounding environment of the HMD, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The HMD disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154.

The interface unit 160 serves as an interface with various types of external devices that are coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). Application programs may be stored in the memory 170, installed in the HMD 100, and executed by the controller 180 to perform an operation (or function) for the HMD 100.

The controller 180 typically functions to control an overall operation of the HMD 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of components illustrated in FIG. 1A, to execute an application program that have been stored in the memory 170. In addition, the controller 180 may control at least two of those components included in the HMD to activate the application program.

The power supply unit 190 may be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

At least part of the components may cooperatively operate to implement an operation, a control or a control method of an HMD according to various embodiments disclosed herein. Also, the operation, the control or the control method of the HMD may be implemented on the HMD by an activation of at least one application program stored in the memory 170.

Hereinafter, description will be given in more detail of the aforementioned components with reference to FIG. 1A, prior to describing various embodiments implemented through the HMD 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be provided in the HMD 100 to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a device (e.g., a control device, a terminal, etc.) which is connected to the HMD to control the HMD. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports, through wireless area networks, wireless communications between the HMD 100 and a wireless communication system, between the HMD 100 and another HMD, between the HMD 100 and a mobile or stationary terminal, between the HMD 100 and a control device, between the HMD 100 and a camera externally installed to perform wireless communication, or between the HMD 100 and an external server. One example of the wireless area networks is a wireless personal area networks.

Here, the HMD may be a device (e.g., a mobile phone, a smart phone, a smartwatch, a laptop computer, a controller, etc.) which can exchange data with (or cooperative with) the HMD 100. The short-range communication module 114 may sense (or recognize) a device, which can perform communication with the HMD 100, in the vicinity of the HMD 100. In addition, when the sensed device is a device which is authenticated to communicate with the HMD 100, the controller 180, for example, may cause transmission of at least part of data processed in the HMD 100 to the device or at least part of data processed in the device to the HMD 100 via the short-range communication module 114.

Hence, a user of the HMD 100 may use the data processed in the device through the HMD 100. For example, when a call is received in the device, the user may answer the call using the HMD 100. Also, when a message is received in the device, the user may check the received message using the HMD 100.

The location information module 115 is a module for acquiring a position (or a current position) of the HMD 100. As an example, the location information module 115 includes a Global Position System (GPS) module or a Wi-Fi module. For example, when the HMD uses a GPS module, a position of the HMD may be acquired using a signal sent from a GPS satellite. As another example, when the HMD uses the Wi-Fi module, a position of the HMD may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the HMD. The location information module 115 is a module used for acquiring the position (or the current position) of the HMD, and may not be limited to a module for directly calculating or acquiring the position of the HMD.

Next, the input unit 120 is configured to permit various types of inputs to the HMD 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the HMD 100 may be arranged in a matrix configuration to permit a plurality of images having various angles or focal points to be input to the HMD 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the HMD 100. If desired, the microphone 122 may include assorted noise removing algorithms to remove unwanted noise generated in the course of receiving the external audio signal.

The user input unit 123 is a component that permits input by a user. Such user input may enable the controller 180 to control an operation of the HMD 100. The user input unit 123 may include one or more of a mechanical input element (for example, a mechanical key, a button located on a front and/or rear surface or a side surface of the HMD 100, a dome switch, a jog wheel, a jog switch, and the like), or a touch-sensitive input element, among others. As one example, the touch-sensitive input element may be at least one of a touch pad and a touch panel.

The sensing unit 140 is generally configured to sense one or more of internal information of the HMD, surrounding environment information of the HMD, user information, or the like, and generate a corresponding sensing signal. The controller 180 generally cooperates with the sending unit 140 to control operation of the HMD 100 or execute data processing, a function or an operation associated with an application program installed in the HMD 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch-sensitive input element of the user input unit 123 is implemented as a capacitance type, the proximity sensor 141 may sense proximity of a pointer having conductivity by changes of an electromagnetic field, which is responsive to an approach of the pointer. In this case, the user input unit 123 itself may also be categorized as a proximity sensor.

The term "proximity touch" will often be referred to herein to denote a motion (action) that the pointer is closely located above the user input unit 123 without being in contact with the user input unit 123. The term "contact touch" will often be referred to herein to denote a motion (action) that the pointer is actually brought into contact with the user input unit 123. For the position corresponding to the proximity touch of the pointer relative to the user input unit 123, such position will correspond to a position where the pointer is perpendicular to the user input unit. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the display unit 151. In addition, the controller 180 may control the HMD 100 to execute different operations or process different data (or information) according to whether a touch with respect to the same point on the user input unit 123 is either a proximity touch or a contact touch.

A touch sensor senses a touch (or a touch input) applied to the user input unit 123 using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the user input unit 123, or convert capacitance occurring at a specific part of the user input unit 123, into electric input signals. The touch sensor may also be configured to sense a touch position, a touch area, touch pressure, touch capacitance when a touch object touches the user input unit 123. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the user input unit 123 has been touched. Here, the touch controller may be a component separate from the controller 180, the controller 180, and combinations thereof.

Meanwhile, the controller 180 may execute the same or different controls according to a type of touch object that touches the user input unit 123. Whether to execute the same or different control according to a type of a touch object may be decided based on a current operating state of the HMD 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit by a stereoscopic processing unit. The stereoscopic processing unit may receive the 3D image (an image of a reference time point and an image of an extension time point), and extract the left image and the right image, or may receive 2D images and change them into a left image and a right image.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's head, face, fingers or arm, as well as transferring the tactile effect through direct contact. Two or more haptic modules 153 may be provided according to the particular configuration of the HMD 100.

An optical output module 154 may output a signal for indicating an event generation using light of a light source of the HMD 100. Examples of events generated in the HMD 100 may include a message reception, a call signal reception, a missed call, an alarm, a schedule notice, an email reception, information reception through an application, an output of an image (image, video, etc.) and the like. That is, the optical output module 154 may notify that the HMD 100 is performing a specific operation (function) by the user.

A signal output by the optical output module 154 may be implemented in such a manner that the HMD emits monochromatic light or light with a plurality of colors. The signal output may be terminated in response to the HMD sensing a user's event confirmation, or an operation currently performed in the HMD being ended.

The interface unit 160 serves as an interface for every external device to be connected with the electronic device 100. For example, the interface unit 160 may receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HMD 100 is connected with an external cradle, the interface unit 160 may serve as a passage to allow power from the cradle to be supplied to the HMD 100 or may serve as a passage to allow various command signals input by the user from the cradle to be transferred to the HMD therethrough. Various command signals or power input from the cradle may operate as signals for recognizing that the HMD 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

Meanwhile, as aforementioned, the controller 180 may typically control operations relating to application programs and the general operations of the HMD 100. For example, the controller 180 may set or release a lock state for restricting a user from inputting a control command with respect to applications when a status of the HMD meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the HMD 100 according to the present invention.

The power supply unit 190 receives external power or provide internal power and supply the appropriate power required for operating respective elements and components included in the mobile terminal 100 under the control of the controller 180. The power supply unit 190 may include a battery, which is typically rechargeable or be detachably coupled to the HMD Body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
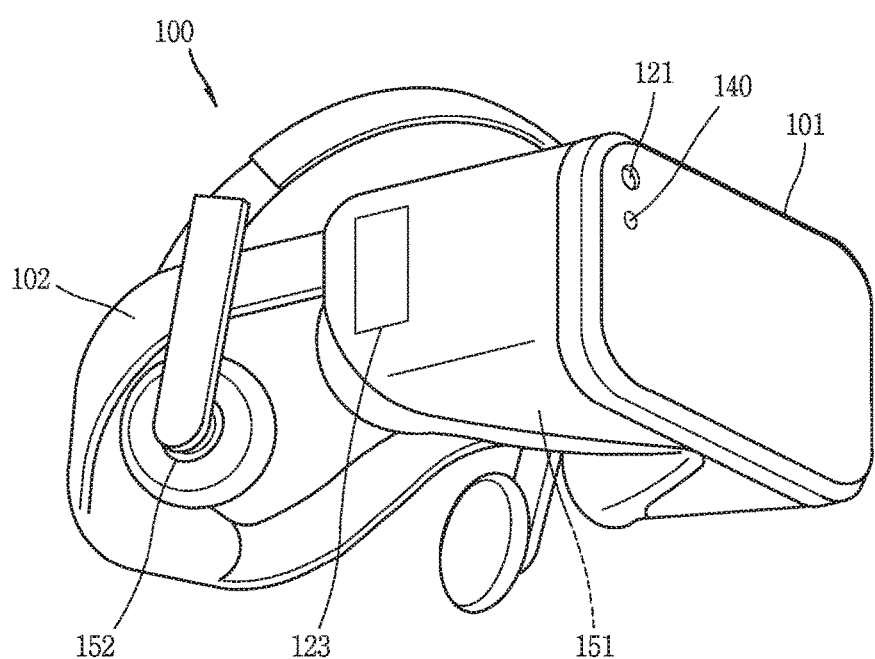
FIGS. 2A and 2B are conceptual views illustrating one example of the HMD according to the present invention.
Figure 2B:
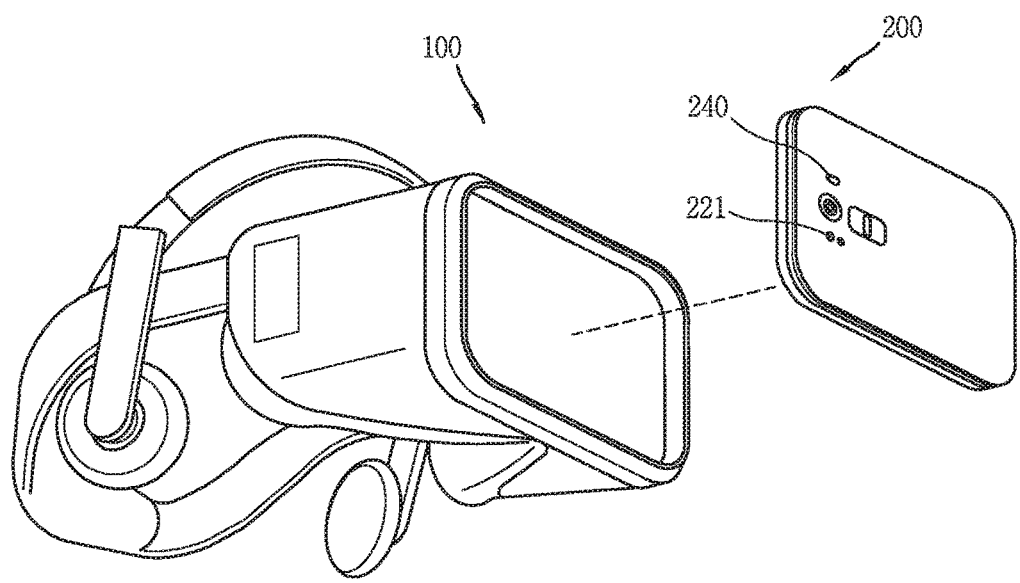

FIGS. 2A and 2B are conceptual views illustrating one example of the HMD according to the present invention. Referring to FIG. 2A, FIG. 2A is a conceptual view illustrating an HMD related to the present invention, viewed in one direction.

The HMD 100 according to the present invention may be formed to be worn on a head portion of a human body (or a head, a face, etc.), and include a frame part (a case, a housing, a cover, etc.). The frame part may be formed of a flexible material to facilitate wearing. This drawing illustrates that the frame part includes a first frame 101 and a second frame 102 which are made of different materials.

For example, the first frame 101 may serve to provide a space in which at least one of the components described with reference to FIG. 1 can be disposed, and the second frame 102 may serve to support (or fix) the first frame 101 to be mounted on the head portion of the human body.

The frame part may be referred to as a main body (or an HMD main body) or a body (or an HMD body). Here, the HMD main body (or the HMD body) may also be understood as a conception referring to as at least one assembly. Hereinafter, the same reference numeral 100 is used for the HMD and the main body.

Meanwhile, if the frame part including the first frame 101 and the second frame 102 is regarded as one HMD body, the main body of the HMD related to the present invention may be configured in various forms. Specifically, the main body may include a plurality of surfaces having preset angles. The plurality of surfaces indicate outer surfaces of the main body of the HMD 100. From this perspective, the plurality of surfaces may indicate the surfaces (outer surfaces, etc.) of the HMD 100. Each of the plurality of surfaces may be flat or curved.

The main body (frame part) is supported on the head, and defines a space for mounting various components. As illustrated, electronic components such as a camera 121, a display unit, a user input unit 123, a controller (or control unit), a sensing unit 140, and the like may be mounted on the first frame 101.

The second frame 102 may be provided with an electronic component such as the audio output module 152 or the like.

However, the present invention is not limited to this, and the components described in FIG. 1 and the components necessary for the HMD may be variously arranged in the first frame 101 and the second frame 102 according to the user's selection. The head-mounted display described herein may have more or fewer components than the components listed above.

The controller 180 (see FIG. 1) is configured to control various electronic components included in the HMD 100. The processor 180 may be understood as a component corresponding to the controller 180 described in FIG. 1.

As illustrated in FIG. 2A, the camera 121 may be provided on the main body 100. For example, the camera 121 may be disposed on one surface (for example, front surface) of the main body 100. The camera 121 is disposed adjacent to at least one of the left eye and the right eye, to capture (take, photograph) an image of a front side. Since the camera 121 is disposed adjacent to the eye to face forward, the camera 121 may acquire a scene viewed by the user as an image.

This drawing illustrates that one camera 121 is provided, but the present invention is not limited thereto. The camera 121 may be provided in plurality to acquire a stereoscopic image.

The HMD 100 may include the sensing unit 140 configured to measure a distance. For example, the sensing unit 140, as described in FIG. 1, may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 121), a microphone 122, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), and the like.

For example, the controller 180 may detect the motion of the HMD using a gyroscope sensor, a gravity sensor, a motion sensor, and the like included in the sensing unit 140. Alternatively, the controller 180 may detect an object approaching the surrounding of the HMD body by using a proximity sensor, an illumination sensor, a magnetic sensor, an infrared sensor, an ultrasonic sensor, or an optical sensor included in the sensing unit 140.

Meanwhile, the sensing unit 140 related to the present invention may be configured to measure a distance between a subject corresponding to an image received through the camera 121 and the HMD body 100. That is, the sensing unit 140 may perform a distance measurement function. For example, the controller 180 may use an infrared sensor (IR sensor) included in the sensing unit 140 to measure a distance between one portion (or one point) of an image received through the camera 121 and the HMD body 100.

For example, the sensing unit 140 may be configured to emit infrared rays. The sensing unit 140 may be configured to detect (sense, receive) infrared rays received from the outside. The sensing unit 140 may emit infrared rays toward the subject corresponding to the image, and may detect infrared rays reflected by the subject. Then, the controller 180 may measure (determine, decide) the distance between the subject and the HMD body 100 based on time taken for the infrared ray to be emitted and reflected back, speed of the infrared rays, and the like.

The distance between the subject and the HMD body 100 may indicate a distance between the subject and the camera 121, a distance between the subject and the sensing unit 140, a distance between the subject and a preset one point of the HMD body 100 (e.g., a central point of the front surface of the HMD body), and a distance between the subject and the head of the user wearing the HMD.

The HMD 100 may include the user input unit 123 configured to receive a control command. The user input unit 123 may employ any method so long as it can be operated by the user in a tactile manner, such as touching or pushing. This drawing illustrates that the frame part is provided with the user input part 123 employing push and touch input manners.

In addition, the HMD 100 may be provided with a microphone (not illustrated) for receiving sound and processing the sound into an electric audio data, and an audio output module 152 for outputting sound. The audio output module 152 may be configured to transmit sound in a general sound output manner or a bone-conduction mode. In case where the audio output module 152 is implemented in the bone-conduction manner, when the user wears the HMD 100, the audio output module 152 is brought into close contact with the head and vibrates a skull to transmit sound.

The display unit 151 is mounted on the frame part and outputs screen information (e.g., image, moving picture, video, etc.) to the front of the user's eyes. When the user wears the HMD 100, the display unit 151 may be arranged to correspond to at least one of the left eye and the right eye so that screen information can be displayed in front of the user's eye. Here, the display unit 151 may be formed to cover at least one of the left and right eyes of the user (or to face at least one of the left and right eyes of the user).

In addition, the display unit 151 of the HMD according to the present invention may be located inside the main body. Specifically, the display unit 151 is disposed inside the HMD, and when the user wears the HMD on the head, the display unit 151 may be disposed at a position facing the user's eyes.

FIG. 2A illustrates that the display unit 151 is positioned to cover both the left and right eyes so that an image can be output toward both the left and right eyes of the user.

Also, the display unit 151 may project an image to the user's eyes using a prism. Further, the prism may be formed to be transmissive so that the user can view the projected image and a general front view (a range viewed by the user through the eyes) together.

As described above, the image output through the display unit 151 may be viewed in a manner of overlapping the general view. The HMD 100 may provide Augmented Reality (AR), in which a virtual image is superimposed on a real image or a background to be viewed as a single image, by using the characteristics of the display.

That is, the display unit 151 may be configured in a manner that external light is not transmitted therethrough to realize Virtual Reality (VR), or external light is transmitted therethrough to realize Augmented Reality (AR).

In addition, the display unit 151, which covers at least one of the left and right eyes, may be detachably mounted on the frame.

Also, the display unit 151 may be a display unit of an external mobile terminal. Referring to FIG. 2B, the HMD body 100 (frame part) may be configured to be detachably coupled with an external mobile terminal 200, so as to be electrically connected to the external mobile terminal 200. When the HMD body 100 is electrically connected to the external mobile terminal 200, the controller 180 of the HMD may control the external mobile terminal 200.

For example, the controller 180 of the HMD may output screen information on the display unit of the external mobile terminal 200 or may drive a camera provided in the external mobile terminal 200. The controller 180 of the HMD may also measure a distance between a subject and the external mobile terminal 200 using a sensing unit 240 (for example, an infrared sensor) provided in the external mobile terminal 200.

When the display unit of the external mobile terminal 200 is mounted facing the left and right eyes of the user, the display unit 151 may be the display unit of the external mobile terminal.

The external mobile terminal 200 may include at least one of the components described with reference to FIG. 1, and the description given with reference to FIG. 1 will be applied in the same/like manner.

Also, as illustrated in FIG. 2B, when the external mobile terminal 200 is mounted on the HMD body 100, the components of the camera 121, the sensing unit 140, the display unit 151, the controller 180 and the like of the HMD 100 described above may be replaced with components of a camera 221, a sensing unit 240, a display unit, and a controller and the like provided in the external mobile terminal 200.

Hereinafter, the description of the HMD 100 may be applied to the external mobile terminal 200, that is, the mobile terminal in the same/like manner.

Hereinafter, description will be given in more detail of a method of determining a posture of the HMD, that is, a motion of the HMD according to one embodiment of the present invention, with reference to the accompanying drawings.

FIG. 3 is a flowchart illustrating a representative control method according to the present invention, and FIG. 4 is a conceptual view illustrating the control method illustrated in FIG. 3.

The HMD 100 according to the present invention, which may include at least one of the components described in FIGS. 1 and 2B, may receive an image through the camera 121.

The image input (received) through the camera 121 may be referred to as a preview image and refer to an image received through the camera 121 in real time. That is, the image (or screen information included in the image) received through the camera 121 may change, in response to a motion of the HMD 100 (e.g., a motion of the user wearing the HMD 100) caused by an external force, a movement of a subject (or object) existing within an angle of view (or a viewing angle) of the camera 121, and the like.

The image (preview image) may be output on the display unit 151. Further, the image may be captured based on a user control command. The captured image may be stored in the memory 170.

The controller 180 may correct distortion generated by a lens included in the camera when the image is received through the camera 121 (Lens Distortion Correction (LDC)).

Afterwards, referring to FIG. 3, in order to determine the motion of the HMD, a plurality of feature points (keypoints, interesting points) included in the image input through the camera 121 are determined (extracted, detected, or decided) (S310).

Specifically, when the image is input through the camera 121, the controller 180 may decide a plurality of feature points satisfying a preset condition in the image (or by analyzing the image). The feature point satisfying the preset condition may refer to information (point, area, part, etc.) used for tracking or recognizing the object (subject) more easily using the image input through the camera.

For example, the feature point satisfying the preset condition may refer to a feature point extracted through a feature point extraction algorithm. The feature point satisfying the preset condition may be, for example, a corner point. The corner point may be a point where a first straight line and a second straight line included in the image are in contact (or meet) with each other when the first straight line and the second straight line are connected at a preset angle (e.g., about 90°).

Specifically, when the image is received through the camera 121, the controller 180 may extract the corner point from the image using the feature point extraction algorithm, and determine the extracted corner point as the feature point satisfying the preset condition.

However, the present invention is not limited to this, and even though one point on a straight line, namely, one point on a plane satisfies a preset condition, the controller 180 may extract the one point as the feature point. Here, the preset condition may correspond to whether or not a color change value included in the image exceeds a threshold value.

(The algorithm itself for extracting the feature point deviates from the gist of the present invention, so a detailed description thereof will be omitted.)

Referring to (a) of FIG. 4, when an image 400 is input through the camera provided in the HMD 100, the controller 180 may extract a feature point 420, which satisfies a preset condition, from the image 400. Specifically, when a subject (point) 410 satisfying a preset condition among subjects present in one space is received using an image through the camera 121, the controller 180 may extract a portion, which corresponds to the subject (point) 410 satisfying the preset condition, as the feature point 420.

Thereafter, in the present invention, a distance between the HMD body and the subject corresponding to at least one of a plurality of feature points is measured using the sensing unit (e.g., the infrared sensor) provided in the HMD (S320).

Specifically, the controller 180 may measure a distance between the HMD body 100 and a subject corresponding to one of a plurality of feature points satisfying a preset condition, using the sensing unit 140 which is capable of measuring the distance between the subject and the main body.

For example, the sensing unit 140 may be the infrared sensor. Referring to (b) of FIG. 4, the controller 180 may measure a distance (actual distance) d1, d2 between the HMD body 100 and a subject V1, which corresponds to at least one of a plurality of feature points satisfying a preset condition and is included in the image, through the infrared sensor.

For example, the controller 180 may measure the actual distance d1 between the subject V1 and the main body 100 in a state where the main body 100 is present at a first point 100(a). When the main body 100 is moved by the user to (present at) a second point 100(b) different from the first point, the controller 180 may re-measure the actual distance d2 between the subject V1 and the main body 100.

However, the present invention is not limited thereto. In the present invention, the controller may alternatively measure the distance between the subject and the main body 100 using a plurality of cameras.

Hereinafter, description will be given of an example in which two cameras 121 provided in one body are disposed at points 100 illustrated in FIG. 4 spaced apart from each other, with reference to (b) of FIG. 4. The distance (actual distance) between the subject 410 and the main body 100 corresponding to the at least one feature point 420 may be measured using the at least two cameras.

In detail, the HMD body 100 may be provided with at least two cameras disposed with being spaced apart from each other. For example, a first camera of the at least two cameras may be located at the point 100(*a*) illustrated in (b) of FIG. 4, and a second camera different from the first camera may be located at a point 100(*b*) illustrated in (b) of FIG. 4.

The at least two cameras may each receive the image 400. When the at least two cameras capture the subject 410 corresponding to the feature point, the feature point 420 corresponding to the subject 410 may be output on different positions in images (e.g., images A and B) received through the at least two cameras.

As a method of measuring a distance between a subject and the main body using at least two cameras, for example, an epipolar geometry algorithm or a triangulation algorithm may be used.

The epipolar geometry algorithm may be an algorithm of acquiring images of the same subject or scene at different points (the at least two cameras arranged with being spaced apart from each other), and measuring the distance between the subject and the main body using geometric relationship between feature points (matching pair) of the acquired plurality of images (e.g., images A and B). When using the epipolar geometry algorithm, at least five pairs of feature points (matching points) may be used. However, the present invention is not limited to this. In some cases, eight pairs of feature points are required depending on a kind of algorithm. In some cases, only three pairs, two pairs or one pair of feature points are required.

The measured distance (actual distance) is used to determine the motion of the HMD (or HMD body) 100. More specifically, in the present invention, the motion of the HMD can be determined by using the actual distance between the HMD body 100 and the subject corresponding to the at least one of the plurality of feature points, thereby remarkably improving accuracy.

Thereafter, in the present invention, the motion of the main body of the HMD is determined based on the measured actual distance and the plurality of feature points (S330). Specifically, the controller 180 may measure a distance between the main body and a subject corresponding to at least one of a plurality of feature points, and determine a motion of the main body 100 based on at least one of the plurality of feature points and the measured distance.

Hereinafter, for convenience of explanation, the motion of the main body will be described by being divided into a movement and a rotation of the main body 100. The movement of the main body 100 refers to that the HMD moves in a forward direction, and the rotation of the main body 100 refers to that the HMD rotates to left or right or up and down based on one reference line (or reference point). In addition, the controller 180 may detect the motion of the HMD body that moves to form a curve by combining the movement and the rotation of the main body.

Specifically, the controller 180 may determine the motion of the main body based on a rate of change of relative distances among the plurality of feature points and the measured distance (or a rate of change of the measured distance).

For example, the controller 180 may decide (determine) a rotated degree of the main body based on the rate of change of the relative distances among the plurality of feature points and the rate of change of the measured distance. Also, the controller 180 may decide an actually moved distance of the main body based on the rate of change of the measured distance.

Hereinafter, description will be given in more detail of a method for determining the motion of the HMD using a measured distance and relative distances among a plurality of feature points, with reference to FIGS. 5A and 5B.

FIGS. 5A and 5B are conceptual views illustrating in more detail a method of determining a movement of the HMD in accordance with one embodiment of the present invention.

First, description will be given of a method of determining a moved degree of the main body (i.e., an actually moved distance of the main body) when the main body 100 moves in one direction (forward direction), with reference to FIG. 5A.

Referring to (a) and (b) of FIG. 5A, the controller 180 decides a plurality of feature points 420*a*, 420*b*, 420*c*, 420*d*, and 420*e*, which satisfy a preset condition, from the image 400 input through the camera 121. Further, the controller 180 determines (measures) relative distances (for example, I1, I2, I3, and I4) among the plurality of feature points.

The controller 180 measures a distance (actual distance) d1 between the main body 100 and a subject 410*a* corresponding to at least one feature point (e.g., 420*a*) of the plurality of feature points using the sensing unit 140.

When the HMD body is then moved by the user, the relative distances among the plurality of feature points 420*a*, 420*b*, 420*c*, 420*d*, and 420*e* included in the image 400 are changed to distances I1', I2', I3', and I4'. For example, as illustrated in (c) of FIG. 5A, when the main body is moved toward the subject, the subject included in the image received through the camera 121 is enlarged, and accordingly the relative distances among the plurality of feature points included in the image 400 increase.

The controller 180 may determine that the HMD body 100 has been moved based on the change in the relative distances among the plurality of feature points.

However, when the actually moved distance (moving distance) of the HMD body is determined only by using the rate of change of the relative distances among the plurality of feature points, it is impossible to determine an accurate moving distance. This is because an actual scale (for example, a size of the subject or the distance between the subject and the main body) has not been reflected.

That is, in case of using only the rate of change of the relative distances among the plurality of feature points, when it is determined that the HMD body has been moved by a specific distance based on a detection of a specific range of change, the moving distance determined by the controller and the actually moved distance of the HMD body differ from each other according to the distance between the main body and the subject corresponding to the feature point. In other words, when the distance between the subject corresponding to the feature point and the main body differs, the rate of change of the relative distances among the plurality of feature points included in the image changes even though the HMD is moved by the same distance.

To measure a more accurate moving distance, as illustrated in (c) of FIG. 5A, when the movement of the HMD is detected, the controller 180 may measure, using the sensing unit 140*a*, distance (actual distance) d2 between the main body 100 and the subject 410*a* corresponding to the at least one feature point (e.g., 420*a*) of the plurality of feature points.

The controller 180 may then decide (determine) the actually moved distance of the main body of the HMD, based on the distance d1 measured before the movement of the HMD body and the distance d2 measured after the rotation of the HMD body.

That is, the controller 180 may decide (determine) the rate of change of the measured distance by using the distances d1 and d2, and decide (determine) the actually moved distance of the HMD body based on the rate of change.

At this time, the controller 180 may determine the actually moved distance of the HMD by using both of the rate of change of the relative distances among the plurality of feature points and the measured distance (or the rate of change of the measured distance).

Further, the controller 180 may determine a rotated distance of the main body based on the rate of change of the relative distances among the plurality of feature points and the rate of change of the measured distance.

Hereinafter, description will be given of a method for determining a rotated degree (i.e., rotated angle) of the main body when the HMD body 100 is rotated, with reference to FIG. 5B.

Referring to FIGS. (a) and (b) of FIG. 5B, the controller 180 decides a plurality of feature points 420a, 420b, 420c, 420d, and 420e, which satisfy a preset condition, from the image 400 input through the camera 121. Further, the controller 180 determines relative distances (for example, I5, I6, I7, and I8) among the plurality of feature points.

The controller 180 measures, using the sensing unit 140, a distance (actual distance) d3 between the main body 100 and the subject 410a corresponding to the at least one feature point (e.g., 420a) of the plurality of feature points.

When the HMD body is rotated by the user, the relative distances among the plurality of feature points 420a, 420b, 420c, 420d and 420e included in the image 400 change to relative distances I5', I6', I7', I8'. For example, as illustrated in (c) of FIG. 5B, when the main body is rotated, the plurality of feature points included in the image received through the camera 121 are moved, and accordingly at least some (e.g., I5' and I8') of the relative distances among the plurality of feature points are shortened and the remaining distances I6' and I7' are lengthened.

The controller 180 may determine that the HMD body 100 has been rotated based on the change of the relative distances among the plurality of feature points or the movement of the plurality of feature points.

However, when the rotated degree (angle) of the HMD body is determined only based on the rate of change of the relative distances among the plurality of feature points, it is impossible to determine an accurate angle. This is because an actual scale (for example, a size of the subject or the distance between the subject and the main body) has not been reflected.

That is, case of using only the rate of change of the relative distances among the plurality of feature points, when it is determined that the HMD body has been rotated by a specific angle based on a detection of a specific range of change, an angle determined by the controller and an actually rotated degree of the HMD body differ from each other according to the distance between the main body and the subject corresponding to the feature point. In other words, when the distance between the subject corresponding to the feature point and the main body differ, the rate of change of the relative distances among the plurality of feature points included in the image changes even though the HMD is rotated by the same angle.

To measure a more accurate rotated degree (angle), as illustrated in (c) of FIG. 5B, when the rotation of the HMD is detected, the controller 180 measures, using the sensing unit 140, a distance (actual distance) d4 between the main body 100 and the subject 410a corresponding to the at least one feature point (for example, 420a) among the plurality of feature points.

The controller 180 may then decide the rotated degree of the HMD body, based on the distance d3 measured before the rotation of the HMD body and the distance d4 measured after the rotation of the HMD body (or the rate of change of the measured distances d3 and d4) and the rate of change of the relative distances among the plurality of feature points.

The controller 180 may also decide the rotated degree of the HMD body, based on the distances d3 and d4 between the main body 100 and the subject 410a corresponding to the at least one feature point 420a, and output positions of the at least one feature point 420a before and after the rotation.

With the configuration, the motion of the HMD can be determined based on not only relative distances among a plurality of feature points included in an image received through the camera and but also an actual distance between the HMD body and a subject corresponding to at least one feature point. Therefore, the present invention can remarkably improve accuracy of determination with respect to the motion of the HMD.

Meanwhile, in the present invention, it is also possible to measure distances between subjects, which correspond to a plurality of feature points included in an image received through a camera, and the main body. For example, in order to detect the motion of the HMD body, a distance between the main body and a subject corresponding to any one of the plurality of feature points may be measured in the early stage, the motion of the HMD body may be determined using the measured distance and relative distances among the plurality of feature points, and then distances between subjects corresponding to the remaining feature points and the main body may sequentially be measured while performing the determination.

In addition, when a new image is received through the camera due to the motion of the main body, the controller 180 may extract a preset plurality of feature points included in the new image and determine the motion of the main body using the extracted feature points.

On the other hand, when a feature point used for measuring the distance between the subject and the main body among the plurality of feature points included in the previously received image disappears from the image due to the motion of the main body, the controller 180 may measure again a distance between the main body and a subject corresponding to at least one feature point of a plurality of feature points decided in a currently received image.

Meanwhile, according to the present invention, when a previously-received image changes to a new image due to a rapid movement of the HMD body by the user, the control method of FIG. 3 may be performed again using the new image.

FIG. 6 is a conceptual view illustrating a control method in case where the HMD is rapidly rotated due to a motion of a user wearing the HMD.

As illustrated in (a) of FIG. 6, the controller 180 may decide a plurality of feature points 600a, 600b, 600c, 600d, and 600e satisfying a preset condition in an image 400a received through the camera 121, and determine (track) a motion of the main body using the decided feature points.

On the other hand, as illustrated in (b) of FIG. 6, when a new image 400b is received through the camera 121 due to a motion (rapid motion) of the main body and the new image 400b does not include the plurality of feature points 600a, 600b, 600c, 600d, and 600e, the controller 180 may decide new feature points 610a, 610b, 610c, 610d, and 610e satisfying the preset condition.

The new feature point is in plurality. The controller 180 may measure using the sensing unit 140 a distance between the main body 100 and a subject corresponding to at least one feature point of the plurality of new feature points 610a, 610b, 610c, 610d, and 610e, to use for determining the motion of the main body 100. Thereafter, the controller 180 may determine the motion of the main body using the measured distance and the plurality of new feature points.

That is, when the pre-decided feature points disappear from the image due to a rapid motion, the flow of FIG. 3 may be executed again.

Meanwhile, the HMD 100 related to the present invention may perform 3D mapping while determining the motion of the main body. Specifically, the controller 180 may determine the motion of the main body and simultaneously produce a 3D map (3D (or stereoscopic) spatial information) using information used for the determination.

Hereinafter, a method of performing 3D mapping in the present invention will be described in more detail with reference to the accompanying drawings.

Figure 7:
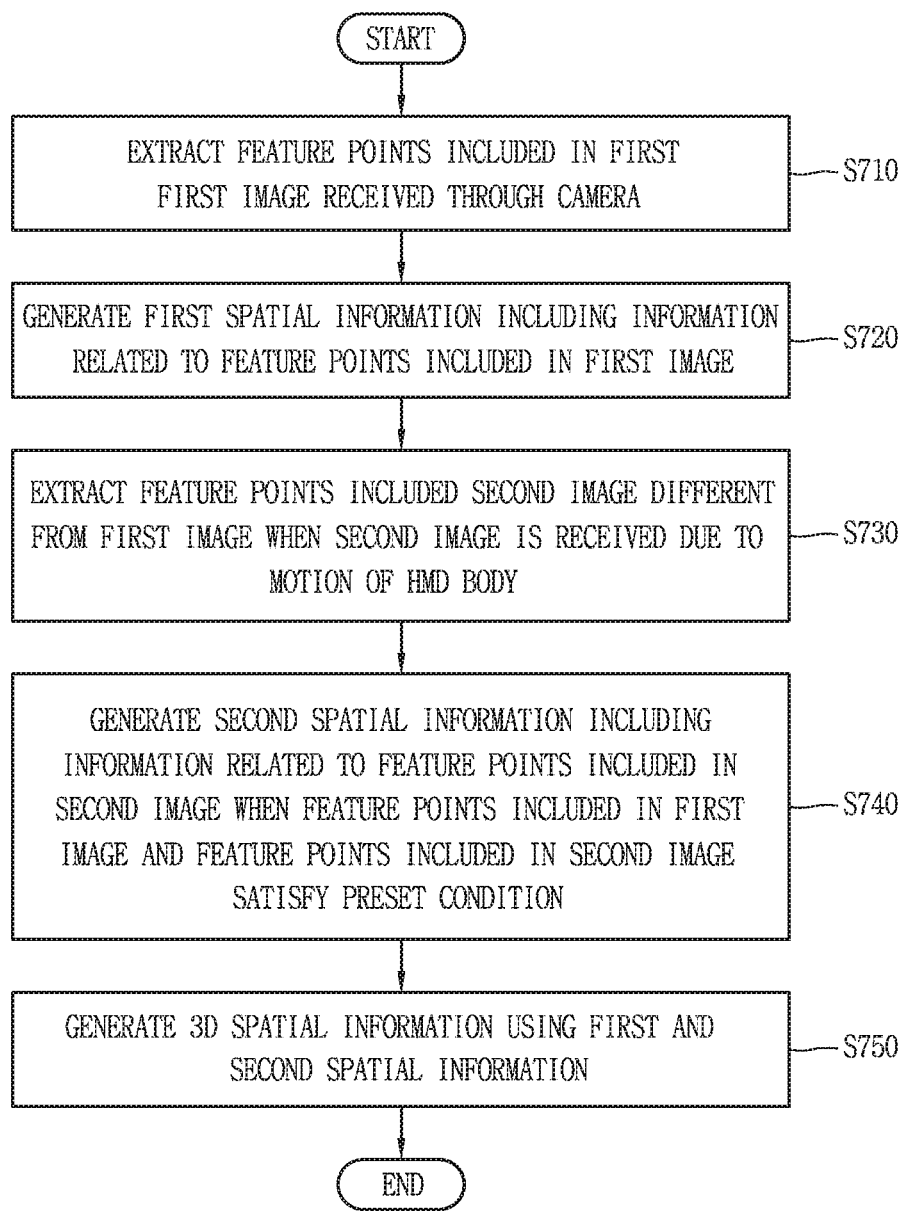
FIG. 7 is a flowchart illustrating a method of performing 3D mapping in accordance with the present invention.
Figure 8A:
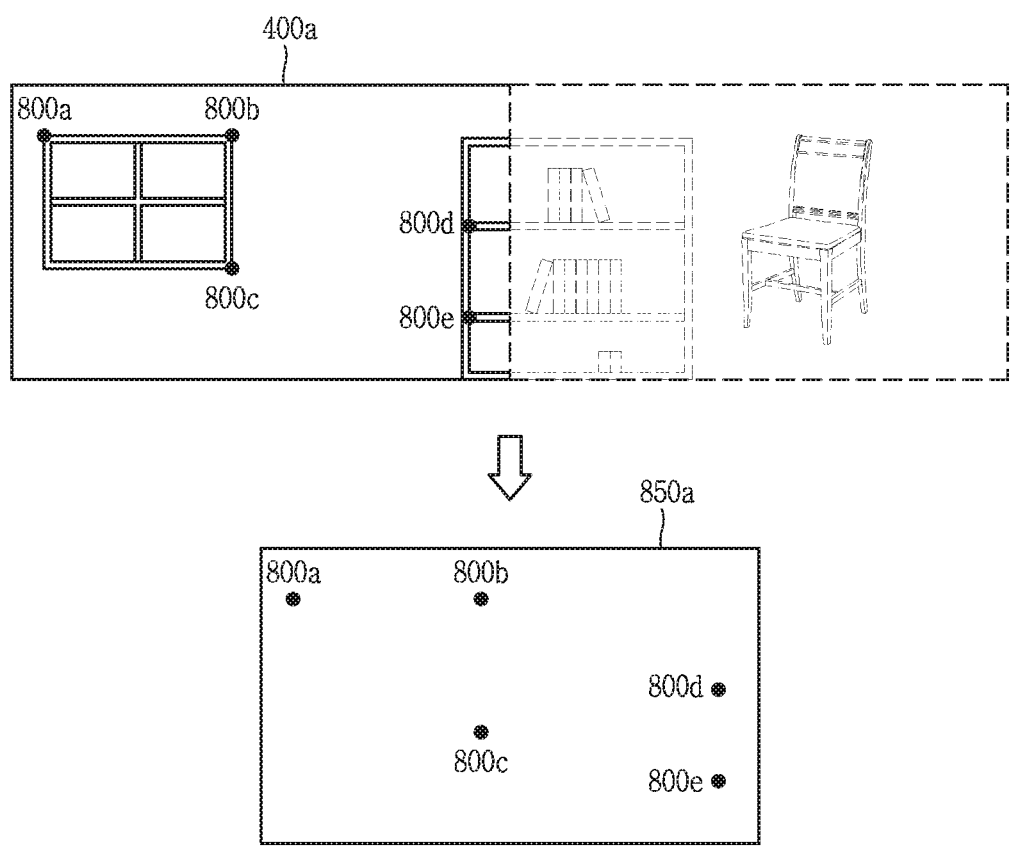
FIGS. 8A, 8B, and 8C are conceptual views illustrating the method illustrated in FIG. 7.
Figure 8B:
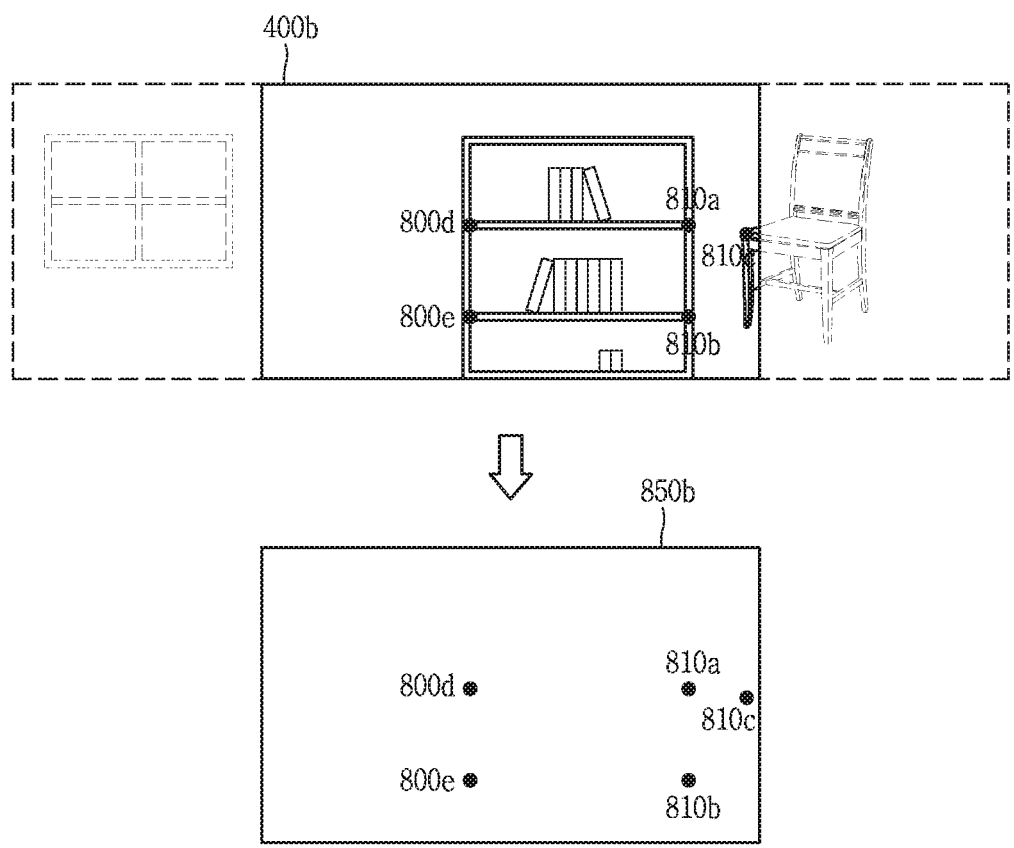
Figure 8C:
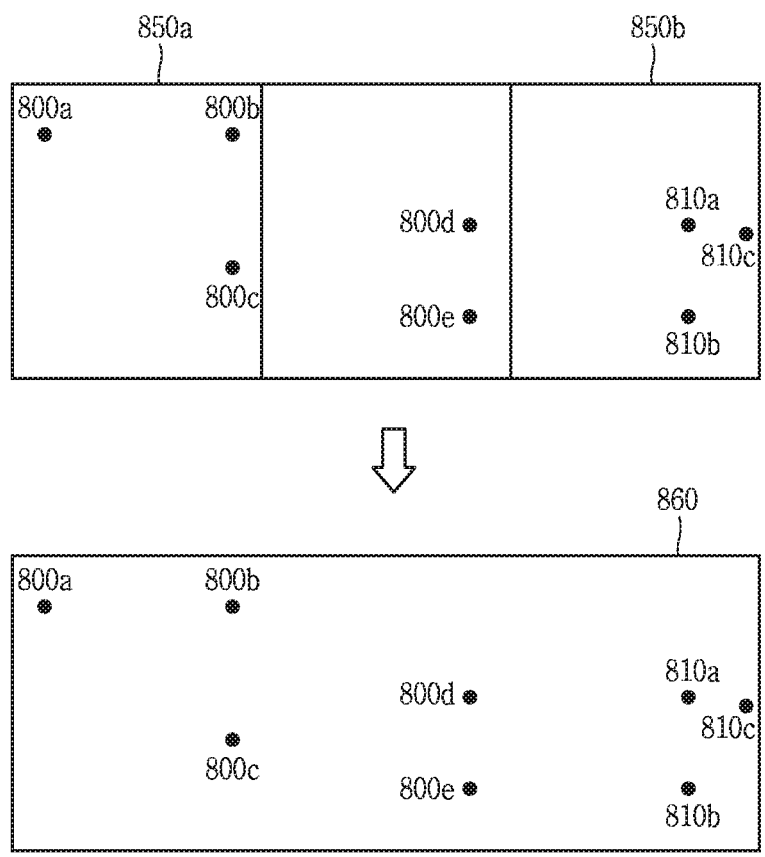

FIG. 7 is a flowchart illustrating a method of performing 3D mapping according to the present invention, and FIGS. 8A, 8B and 8C are conceptual views illustrating the control method illustrated in FIG. 7.

Referring to FIG. 7, feature points included in a first image received through the camera 121 are extracted (S710). In detail, as illustrated in FIG. 8A, the controller 180 may extract a plurality of feature points 800a, 800b, 800c, 800d, and 800e that are included in a first image 400a received through the camera 121 and satisfy a preset condition.

Thereafter, the controller 180 measures using the sensing unit 140 a distance between the main body 100 and a subject corresponding to at least one of the plurality of feature points. In addition, the controller 180 determines relative distances among the plurality of feature points.

The controller 180 determines (tracks, decides, extracts, and tracks) the motion of the main body using the measured distance and the relative distances.

Also, the controller 180 generates first spatial information 850a including information related to the feature points included in the first image 400a (S720).

The information related to the plurality of feature points may include at least one of the distance between the main body 100 and the subject corresponding to the at least one of the plurality of feature points, and the relative distances among the plurality of feature points.

Afterwards, the controller 180 determines (extracts) feature points included in a second image different from the first image when the second image is received due to the motion of the main body of the HMD.

In detail, as illustrated in FIG. 8B, when the HMD body is moved by the user while an image (i.e., the first image) is received through the camera, the controller 180 receives a new image (i.e., the second image) through the camera 121.

The controller 180 decides a plurality of feature points 800d, 800e, 810a, 810b, and 810c that satisfy the preset condition in the second image.

Then, the controller 180 generates second spatial information 850b including information related to the feature points included in the second image 400b.

Meanwhile, when the feature points included in the first image and the feature points included in the second image satisfy the preset condition, the controller 180 generates second spatial information including information related to the feature points included in the second image (S740).

In detail, the controller 180 may generate the second spatial information 850b including the information related to the plurality of feature points included in the second image 400b, based on the number of duplicate (the same) feature points between the plurality of feature points 800a, 800b, 800c, 800d, and 800e included in the first image 400a and the plurality of feature points 800d, 800e, 810a, 810b, and 810c included in the second image 400b.

That is, the second spatial information may be generated every time a new image is received, every time a new feature point is determined, or when a preset condition is satisfied.

For example, the second spatial information 850b may be generated when the number of duplicate feature points is a preset number or less. That is, the controller 180 may generate the second spatial information including the information related to the plurality of feature points included in the second image 400b when the number of the same feature points (or duplicate feature points) between the plurality of feature points included in the first image 400a and the plurality of feature points included in the second image 400b is a preset number or less.

The above process may be performed plural times while the determination of the motion of the HMD is continuously performed. In this case, the controller 180 may generate a plurality of spatial information.

Thereafter, the controller 180 may generate single 3D spatial information using the generated plurality of spatial information (the first spatial information and the second spatial information). The 3D spatial information may be named as a 3D map, a stereoscopic map, or the like.

For example, as illustrated in FIG. 8C, the controller 180 may merge (combine) the first spatial information 850a and the second spatial information 850b in a manner of overlapping the same feature points (or duplicate feature points) included in the first spatial information 850a and the second spatial information 850b. Through this method, the controller 180 can generate single 3D spatial information 860.

As another example, the controller 180 may generate 3D spatial information by adding new feature points (e.g., 810a, 810b, and 810c), which are not included in the first spatial information, based on the first spatial information 850a. That is, in this case, it may be understood as a concept of expanding the first spatial information.

The generation of the 3D spatial information 860 may be performed simultaneously with (parallel to) the process of determining the motion of the HMD.

The controller 180 may store the 3D spatial information 860 in the memory 170 in association with location information related to the HMD.

When a plurality of pieces of 3D spatial information are stored in the memory 170, the controller 180 loads (uses) 3D spatial information corresponding to a space, in which the HMD is currently located, based on the location information associated with the 3D spatial information.

According to this configuration, when the motion of the HMD is newly determined, a plurality of feature points can be more fast decided using the 3D spatial information, and the location of the HMD can be more fast determined based on a subject corresponding to at least one of the plurality of feature points and relative distances among the plurality of feature points, thereby remarkably improving speed of determining the motion of the HMD.

With this configuration, the present invention can determine a motion of the HMD by using feature points included in an image received through the camera, and a distance between the HMD and a subject corresponding to at least one of the feature points. Accordingly, the present invention can provide an optimized method for determining the motion of the HMD without a separate external device.

In addition, the present invention can determine the motion of the HMD based on an actual distance between the HMD body and a subject corresponding to at least one of a plurality of feature points included in an image received through the camera as well as relative distances among the plurality of feature points. Therefore, the present invention can remarkably improve accuracy of determination with respect to the motion of the HMD.

In addition, the present invention can provide a control method capable of performing 3D mapping in an optimized manner using feature points included in an image received through the camera.

Further, the present invention can remarkably improve speed of determining the motion of the HMD by using 3D spatial information generated by the 3D mapping.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A Head Mounted Display (HMD), comprising:
   a main body formed to be wearable on a head of a user;
   a camera provided in the main body;
   a sensing unit configured to measure a distance between the main body and a subject corresponding to an image received through the camera; and
   a controller configured to determine a plurality of feature points satisfying a preset condition in the image, measure using the sensing unit a distance between the main body and a subject corresponding to at least one of the plurality of feature points, and determine a motion of the main body based on at least one of the plurality of feature points and the measured distance
   wherein the controller determines the motion of the main body based on a rate of change of relative distances among the plurality of feature points and a rate of change of the measured distance.

2. The display of claim 1, wherein the controller determines a rotated degree of the main body based on the rate of change of the relative distances among the plurality of feature points and the rate of change of the measured distance, and
   determines an actually moved distance of the main body based on the rate of change of the measured distance.

3. The display of claim 1, wherein the main body is provided with at least two cameras disposed with being apart from each other, and
   wherein the distance between the main body and the subject corresponding to the at least one feature point is measurable using the at least two cameras.

4. The display of claim 1, wherein the controller receives a new image through the camera due to the motion of the main body, and determines a new feature point satisfying the preset condition in the new image when the plurality of feature points are not included in the new image.

5. The display of claim 4, wherein the new feature point is present in plurality, and
   wherein the controller measures a distance between the main body and a subject corresponding to at least one of the plurality of new feature points so as to use for determining the motion of the main body.

6. The display of claim 1, wherein the controller determines a plurality of feature points satisfying the preset condition in a first image received through the camera, and generates first spatial information including information related to the plurality of feature points.

7. The display of claim 6, wherein the information related to the plurality of feature points includes a distance between the main body and a subject corresponding to at least one of the plurality of feature points, and relative distances among the plurality of feature points.

8. The display of claim 6, wherein the controller determines a plurality of feature points satisfying the preset condition in a second image different from the first image when the second image is received through the camera due to the motion of the main body, and generates second spatial information including information related to the plurality of feature points included in the second image based on a number of duplicate feature points between the plurality of feature points included in the first image and the plurality of feature points included in the second image.

9. The display of claim 8, wherein the second spatial information is generated when the number of duplicate feature points is a preset number or less.

10. The display of claim 8, wherein the controller generates stereoscopic spatial information using the first spatial information and the second spatial information.

11. A method of controlling a Head Mounted Display (HMD), the method comprising:
    determining a plurality of feature points satisfying a preset condition in an image received through a camera;
    measuring a distance between a main body thereof and a subject corresponding to at least one of the plurality of feature points; and
    determining a motion of the HMD based on at east one of the plurality of feature points and the measured distance
    wherein the determining is configured to determine the motion of the main body based on a rate of change of relative distances among the plurality of feature points and a rate of change of the measured distance.

12. The method of claim 11, further comprising:
    determining a plurality of feature points satisfying the preset condition in a new image received due to the motion of the HMD; and
    generating three-dimensional (3D) spatial information based on information related to the plurality of feature points included in the image and information related to the plurality of feature points included in the new image.

13. The method of claim 12, wherein the determining is configured to generating first spatial information including the information related to the plurality of feature points included in the image; and
    generating second spatial information including the information related to the plurality of feature points included in the new image when the number of duplicate feature points among the plurality of feature points included in the image and the plurality of feature points included in the new image is a preset number or less, and wherein the three-dimensional spatial information is generated using the first spatial information and the second spatial information.

\* \* \* \* \*